(12) United States Patent
Bishara et al.

(10) Patent No.: US 8,190,718 B1
(45) Date of Patent: May 29, 2012

(54) MODEL DRIVEN COMMAND LANGUAGE TRANSLATOR

(75) Inventors: Nafea Bishara, San Jose, CA (US); Michael Orr, Sunnyvale, CA (US)

(73) Assignee: Marvell international Ltd (BM)

( * ) Notice: Subject to any disclaimer, the term of this patent is extended or adjusted under 35 U.S.C. 154(b) by 142 days.

(21) Appl. No.: 12/767,937

(22) Filed: Apr. 27, 2010

Related U.S. Application Data

(60) Provisional application No. 61/173,011, filed on Apr. 27, 2009.

(51) Int. Cl.
G06F 15/16 (2006.01)
G06F 12/00 (2006.01)

(52) U.S. Cl. ........................................ 709/220; 709/221

(58) Field of Classification Search .................. 709/203, 709/217–221, 250
See application file for complete search history.

(56) References Cited

U.S. PATENT DOCUMENTS

| 5,560,013 | A | * | 9/1996 | Scalzi et al. | ................... | 717/138 |
| 7,716,679 | B1 | * | 5/2010 | Friedman et al. | .............. | 719/316 |
| 8,010,578 | B2 | * | 8/2011 | Laflen et al. | ................... | 707/804 |
| 2002/0147855 | A1 | * | 10/2002 | Lu | ................................. | 709/310 |

* cited by examiner

Primary Examiner — Zarni Maung

(57) ABSTRACT

An embodiment includes a method that includes identifying a first functional effect that would be produced in an apparatus by executing in the apparatus one or more source commands. The embodiment includes determining whether the first functional effect is producible in the apparatus based on the apparatus executing one or more target commands written in a command language different than the language that the source commands are written in. The embodiment includes, in response to determining that the first functional effect is producible in the apparatus based on the apparatus executing the one or more target commands, producing an output comprising the one or more target commands for execution by the apparatus.

15 Claims, 4 Drawing Sheets

MODEL DRIVEN COMMAND LANGUAGE TRANSLATOR

CROSS REFERENCE TO RELATED APPLICATIONS

This disclosure claims the benefit of provisional application No. 61/173,011 filed Apr. 27, 2009, which is wholly incorporated herein by reference.

BACKGROUND

A network switch is a computer networking device that connects network segments. When operating at the data link layer (L2) of the Open Systems Interconnect (OSI) model, the switch may be referred to as a bridge. When operating at the network layer (L3), the switch may be referred to as an L3 switch. When operating at multiple layers, the switch may be referred to as a multi-layer switch.

Conventional multi-layer switches typically are configured in response to commands provided using a command line interface (CLI). The commands are typically written in a command language. Different switch manufacturers may have different command languages. The different command languages may have their own syntax and semantics. Additionally, different switch users may have different command languages with different syntax and semantics. The different languages, syntaxes, and semantics may not be instantly, automatically, and correctly interchangeable.

Providing per user syntax and semantics is difficult, complex, and costly. Therefore attempts have been made to automate translating commands between command languages used by different command line interfaces. When two command languages are functionally equivalent but only differ syntactically, then automated processes may provide adequate translation results. However, when two command languages are not functionally equivalent, then conventional automated source to source translators may not provide adequate translation results. By way of illustration, a source language may include commands that when executed place a network switch in a state that cannot be produced by commands in a target language. Conventionally, either an incorrect translation or an error message would be generated, both of which may leave a user unsatisfied and/or wondering what to do next.

The foregoing statements are not intended to constitute an admission that any patent, publication or other information referred to herein is prior art with respect to this disclosure. Rather, these statements serve to present a general discussion of technology and associated issues in the technology.

SUMMARY

An embodiment includes identifying a first functional effect that would be produced in an apparatus by executing in the apparatus one or more source commands. The embodiment includes determining whether the first functional effect is producible in the apparatus based on the apparatus executing one or more target commands written in a different command language than the source commands. The embodiment includes, in response to determining that the first functional effect is producible in the apparatus based on the apparatus executing the one or more target commands, producing an output comprising the one or more target commands for execution by the apparatus.

BRIEF DESCRIPTION OF THE DRAWINGS

The accompanying drawings, which are incorporated in and constitute a part of the specification, illustrate various example systems, methods, and other example embodiments of various aspects of the invention. The illustrated element boundaries (e.g., boxes, groups of boxes, or other shapes) in the figures represent one example of the boundaries. In some examples one element can be designed as multiple elements or multiple elements can be designed as one element. In some examples, an element shown as an internal component of another element can be implemented as an external component and vice versa. Furthermore, elements may not be drawn to scale.

DETAILED DESCRIPTION

Figure 1:
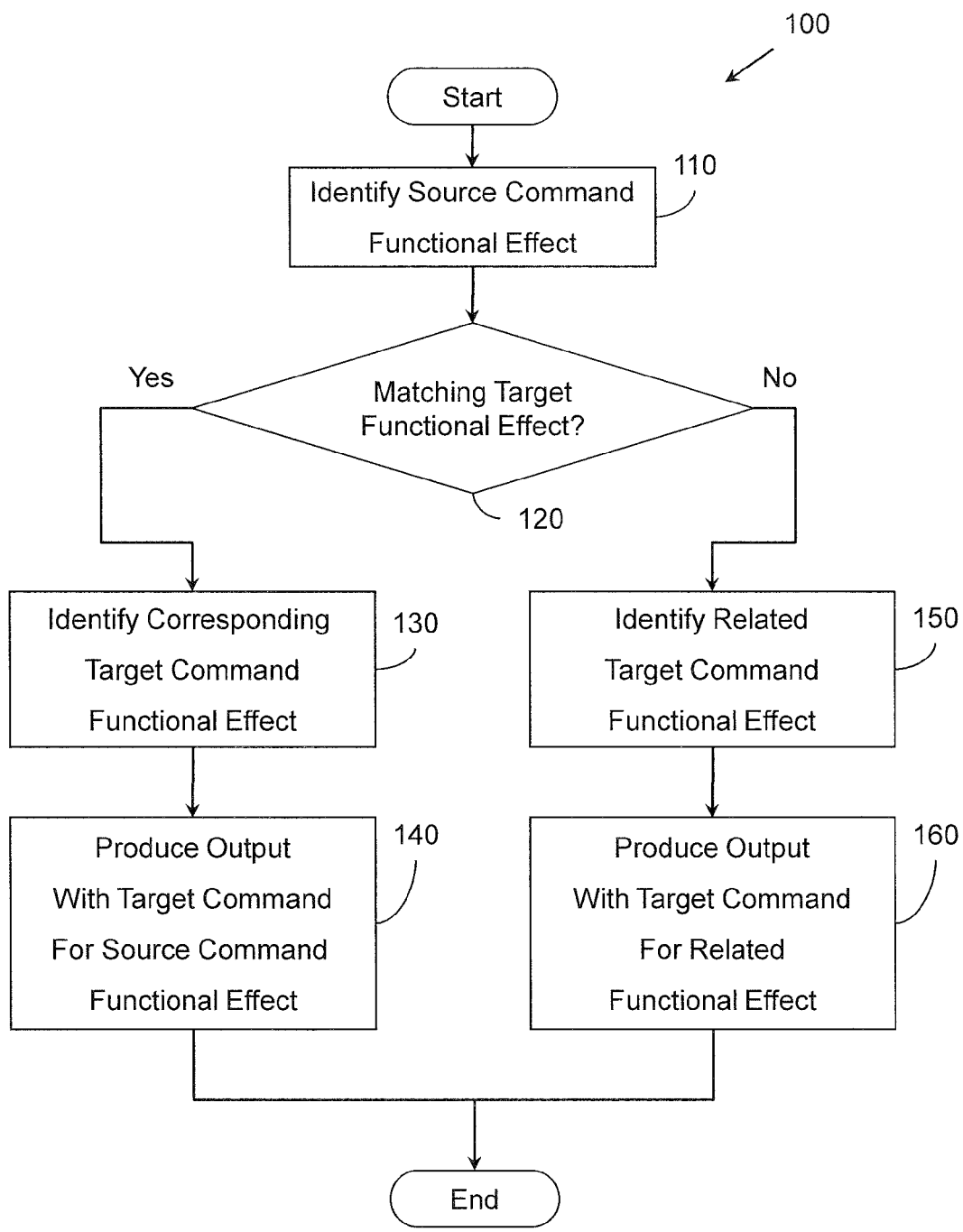
FIG. 1 illustrates a flow chart that describes a method associated with model driven command language translation.

Example methods and devices concern a model driven command language translator that considers the functional effect of a command or sequence of commands when determining how to translate a command or sequence of commands from a source command language to a target command language. Rather than performing a language to language translation like conventional systems, example methods and devices examine source language commands and then consult a model to identify state transitions that would be produced in the device if the source language commands were executed in the order presented. The state transitions are then correlated to results that can be produced by executing target language commands. Example methods and devices therefore perform a model to model translation that captures functional effects rather than simply performing a source language to target language translation that may not capture functional effects.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment, though it may.

Switches are electronic machines. Electronic machines can be modeled using state machines. Commands and sequences of commands executed on a machine can cause transitions between states in a state machine model of the electronic machine. All possible states that some devices (e.g., a switch) can attain are knowable, as are all possible transitions between states. A complete correlation between executable commands and states is also knowable. Therefore it is possible to determine what end state will be produced by executing a set of commands on an electronic machine (e.g., switch, other networking device). Similarly, states that are visited while transitioning from an initial state to a final state can be determined. When a model exists for states and transitions produced by executing commands in a first language, and when a corresponding model exists for states and transitions produced by executing commands in a second language, then a model to model translation that captures functional effects can be performed instead of performing a language to language translation. While switches are described, in different embodiments other networking devices and indeed other apparatuses can employ model to model translation as described herein.

FIG. 1 illustrates a method 100. At 110, method 100 includes identifying a functional effect that would be produced in an apparatus if the apparatus executed source commands written in a source command language. The source commands may be presented to the apparatus using, for example, a command line interface (CLI). The method 100 translates the source commands to target commands based on identifying and matching functional equivalencies in a model. Therefore, at 120, a determination is made concerning whether a matching functional effect can be produced on the apparatus by executing instructions in the target language.

At 130, upon determining that the functional effect can be produced in the apparatus by executing target commands, method 100 identifies the corresponding target command functional effect. Target commands associated with the corresponding target command functional effect can then be selected or inclusion in an output translation.

At 140, method 100 produces an output having the target command(s). The output may be, for example, a script file that is stored in memory or on disk. In another example, the output may be transmitted or otherwise provided to a device (e.g., switch). In yet another example, the output may be executed to create the desired functional effect on the apparatus.

At 150, upon determining that the functional effect cannot be produced in the apparatus by executing target commands, method 100 will instead attempt to identify a related target command function. At 160, method 100 selectively produces an output comprising related target commands written in the target command language that if executed on the apparatus would produce a related functional effect. Method 100 also selectively adds annotations and/or additional information to the output. The additions can include, but are not limited to, a description of the functional effect, an identifier of the functional effect, a description of the related functional effect, an identifier of the related functional effect, a description of an alternative action, an error message, and an error identifier.

The functional effect produced by executing the source commands or the target commands may be treated (e.g., modeled) as a state transition in the apparatus. For example, reconfiguring the apparatus from aggregating ports to not aggregating ports can be modeled by making a state transition in a state machine associated with the apparatus. Since the functional effect may be a state transition, a model of the state machine may be employed. Identifying the functional effect may therefore include identifying in the model a transition from a first state of the apparatus to a second state of the apparatus, where the transition is known to be caused by executing the source commands on the apparatus.

Method 100 may rely on a stored model of the state transitions. In one example, the first state, the second state, and the state transition are represented in a first state machine model associated with the apparatus and the source command language. In this example, identifying the functional effect is based, at least in part, on the first state machine model.

In one example, determining that the functional effect can be produced in the apparatus by executing the target commands comprises identifying a transition from the first state to the second state known to be caused by the target commands. Once again the information (e.g., first state, second state, state transition) may be represented in a second state machine model associated with the apparatus and the target command language. Therefore, identifying the functional effect may be based, at least in part, on the second state machine model. Since both the first state machine model and the second state machine model store states and state transitions, matching states and state transitions can be found. Commands from both the source and target languages that produce those states can then be identified and used in a translation. While a first state machine model and a second state machine model are described, in one embodiment a single model that includes both the first and second model may be employed.

Sometimes it may be possible to produce a translation that will produce an identical functional effect. However, sometimes only a translation that produces a related functional effect may be possible. In these cases the related functional effect may be identified based, at least in part, on a correlation between the transition from the first state to the second state and a different transition between two states in the second state machine model known to be caused by the target commands.

The apparatus may be, for example, a computer networking device. In one example the apparatus may be a multi-layer computer networking switch and the source commands are presented to the computer networking device through a command line interface (CLI). A managed switch can have its operation modified using commands presented by a command line interface (CLI). Operational modifications can include, but are not limited to, enabling/disabling a spanning tree protocol, selecting a spanning tree protocol, setting a port speed, creating a virtual local area network (VLAN), modifying a VLAN, setting a duplex mode, turning a port range on/off, turning on/off Simple Network Management Protocol (SNMP) monitoring of devices and link health, and turning on/off link aggregation. While a managed switch is described, in different embodiments other networking devices and indeed other apparatuses can employ model to model translation as described herein.

A command or a set of commands may be organized in a script. One example method may analyze a script using a semantic model of the functionality associated with a source command language and a device. The model can represent the functional changes that can be made to the device using commands in the source command language. The example method may also have access to a second semantic model of the functionality associated with a target command language in which a network script is to be written and the device. In one example, both models may be stored in a single combined model.

Similarities and differences between two semantic models of functionality can be identified. For example, the first model may identify commands that change port speed and the second model may also identify commands that change port speed. If the same functional effect, changing port speed, can be accomplished using commands from both the source language and the target language, then a direct translation may be possible.

However, the first model may identify commands that create a functional effect (e.g., change port aggregation) that the second model cannot create. Since the same functional effect, changing port aggregation, is not available using commands from both languages, a direct translation may not be possible. When similarities and differences between the two models are identified, correlations of similarities may be stored. Additionally, information concerning where functional equivalency cannot be achieved may be stored. This information may then be provided when a translation attempt is made for the missing functional effect. Rather than simply provide an error message, the information may provide a user with details about what can and cannot be done and alternatives.

Additionally, the first model may identify commands that produce one functional effect that has a similar, though not identical functional effect in the second model. For example, source commands may transition the state machine from a first state to a second state and then a third state and finally a fourth state. Target commands may only be able to transition the state machine from the first state to the second and then to the third but not to the fourth, leaving a related but incomplete and inexact translation. While incomplete and inexact, the related functional effect may still be useful, especially if the output translation is annotated with details of what was accomplished, what wasn't accomplished, and suggestions for handling the mismatch. In this case, information concerning the related functional effects may be stored and then provided when a translation attempt is made for the related functional effects. Once again, rather than simply produce a not quite exact translation, or rather than produce an error message, the information may provide a user with details about what was done, what was not done, and alternatives. The information may explain the functional differences between the input and the output, and may provide advice on how to bridge the gap.

Figure 2:
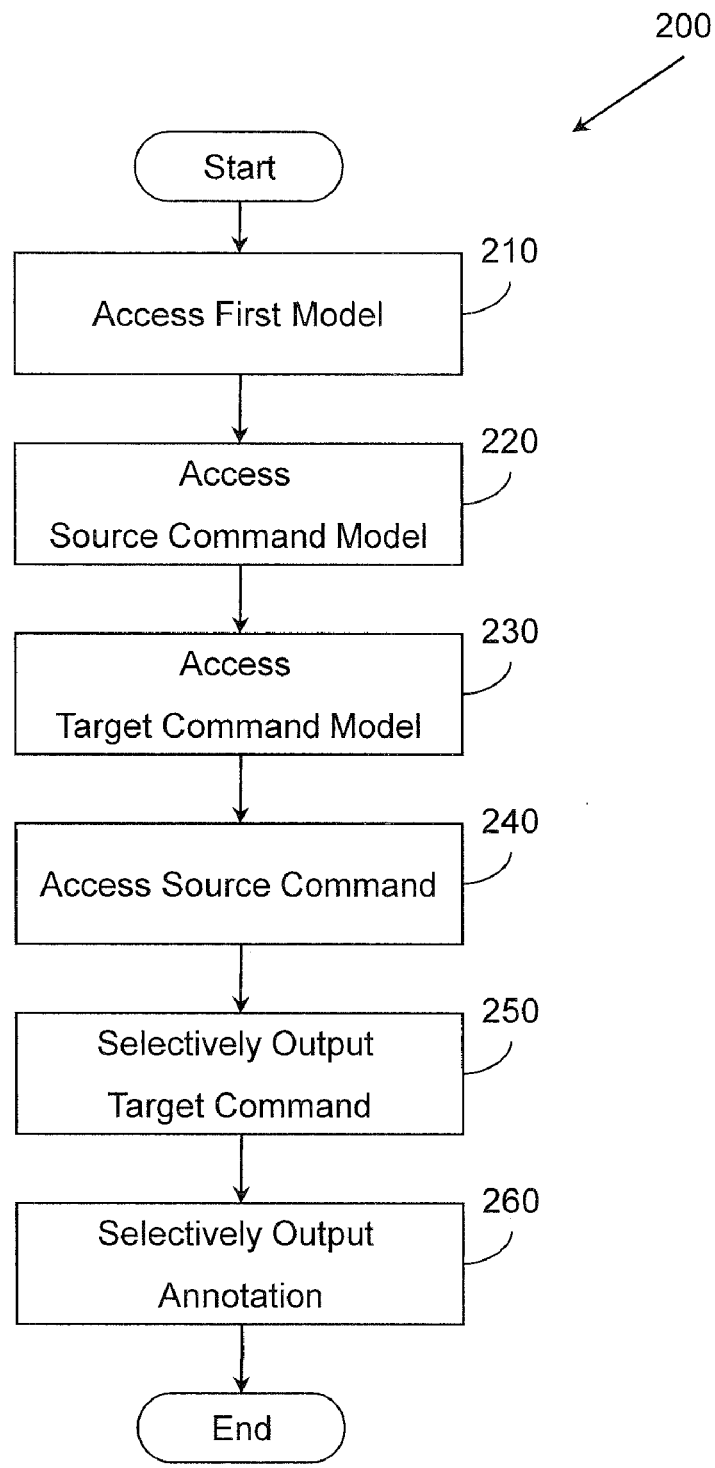
FIG. 2 illustrates a flow chart that describes a method associated with model driven command language translation.

FIG. 2 illustrates a method 200. At 210, method 200 includes accessing a first model of a computer networking device. The first model identifies functional configurations into which the computer networking device can be placed. The first model may be device specific and language agnostic, storing the states for a machine without reference to commands that produce transitions between states.

At 220, method 200 includes accessing a source command language model. The source command language model identifies a subset of functional configurations in the first model into which the computer networking device can be placed by executing commands from the source command language. The source command language model can be correlated to the first model, which is language agnostic, using the functional effects (e.g., state transitions) stored in both models.

At 230, method 200 includes accessing a target command language model. The target command language model identifies a subset of functional configurations in the first model into which the computer networking device can be placed by executing commands from the target command language. The target command language model can be correlated to the first model, which is language agnostic, using the functional effects (e.g., state transitions) stored in both models. Since the source model and the target model can both be correlated to the first model based on functional effects, it follows logically that the source model can be correlated to the target model through the first model based on functional effects. This functional effect based correlation facilitates translating source commands to target commands based on functional effects.

At 240, method 200 includes accessing a source command written in the source command language. The source command may be received through a command line interface (CLI).

At 250, method 200 includes selectively producing an output comprising a target command written in the target command language. The command written in the target command language, when executed by the computer networking device, will cause the computer networking device to be placed in a functional configuration that would be produced if the source command was executed on the computer networking device. The target command can be identified because of the correlations made possible by the shared functional effects in the models. The output produced by method 200 can be presented to the computer networking device via a CLI.

To accommodate translations that will not produce exact functional equivalence, the output may be annotated at 260 with additional information. The additional information may include a description of the functional configuration, an identifier of the functional configuration, a description of an alternate functional configuration, an identifier of an alternate functional configuration, a description of an alternative functional configuration, an identifier of an alternative action, an error message, or an error identifier.

The output may be produced by first identifying a functional configuration that would be produced by executing the source command on the computer networking device, by then identifying the same functional configuration in the target command language model, and then identifying the target command in the target command language model based on the functional configuration. Once again, exact functional equivalency may not be attainable. Therefore, the output may be produced by identifying a functional configuration that would be produced by executing the source command on the computer networking device, identifying a related but not identical functional configuration in the target command language model, identifying the target command in the target command language model based on the related but not identical functional configuration, and then also providing additional data including, but not limited to, the description of the functional configuration, the identifier of the functional configuration, the description of the related but not identical functional configuration, the identifier of the related but not identical functional configuration, the description of the alternative functional configuration, the identifier of the alternative action, the error message, and the error identifier based, at least in part, on the source command, the target command, and the related but not identical functional configuration.

Figure 3:
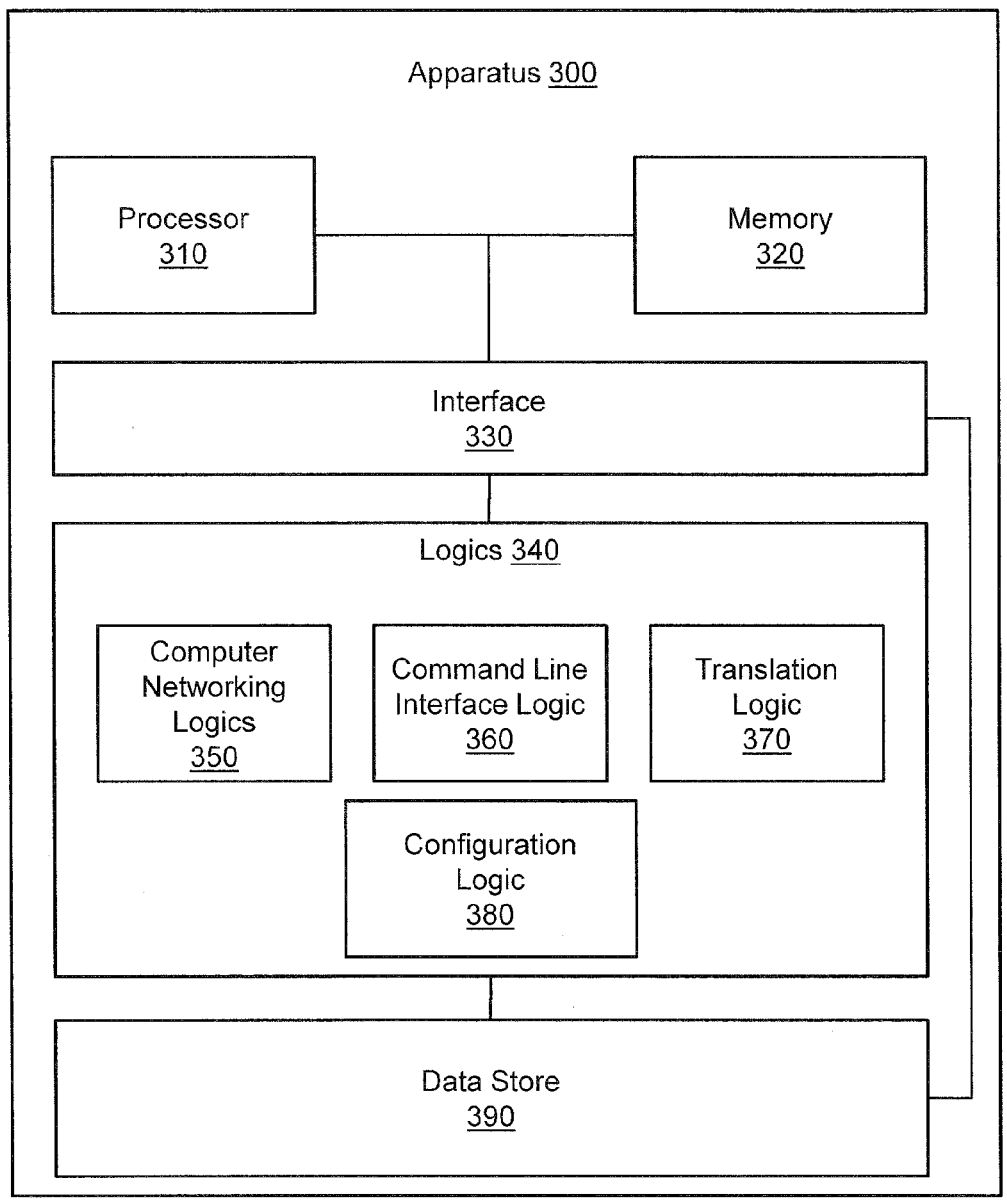
FIG. 3 illustrates an apparatus associated with model driven command language translation.

FIG. 3 illustrates an apparatus 300. Apparatus 300 includes a processor 310, a memory 320, and an interface 330 connecting the processor 300, the memory 320, and a set 340 of logics. The set 340 of logics includes a computer networking logic(s) 350, a command line interface logic 360, a translation logic 370, and a configuration logic 380. The apparatus 300 may also include a data store 390.

The computer networking logic(s) 350 perform a computer networking function. How the networking function is performed is controlled, at least in part, by a configuration. The computer networking function performed by the computer networking logic(s) 350 may include, but are not limited to, enabling a spanning tree protocol, disabling a spanning tree protocol, selecting a spanning tree protocol, setting a port speed, creating a virtual local area network (VLAN), modifying a VLAN, setting a duplex mode, turning a port range on, turning a port range off, turning on Simple Network Management Protocol (SNMP) monitoring of devices, turning off SNMP monitoring of devices, turning on link aggregation, and turning off link aggregation.

The command line interface logic 360 receives source commands. Executing the source commands establishes the configuration. The source commands are written in a source command language. The apparatus 300 may not be able to parse or execute the source commands. Therefore the translation logic 370 selectively translates the source commands from the source command language to target commands written in a target command language that the apparatus 300 can parse and/or execute. The translation is based, at least in part, on a function to function translation model, which may be stored in data store 390. The configuration logic 380 establishes the configuration by executing the target commands.

In one example, the translation logic 370 selectively translates the source commands to the target commands based, at least in part, on relating functional effects represented in the function to function translation model. By way of illustration, the translation logic 370 may identify the target commands as being commands that produce a target functional effect when executed on the apparatus, where the target functional effect is identical to a source functional effect that would be produced by executing the source commands on the apparatus. Additionally, the translation logic 370 may generate explanation data upon determining that there are no target commands that will produce a target functional effect that is identical to a source functional effect that would be produced by executing the source commands on the apparatus.

Figure 4:
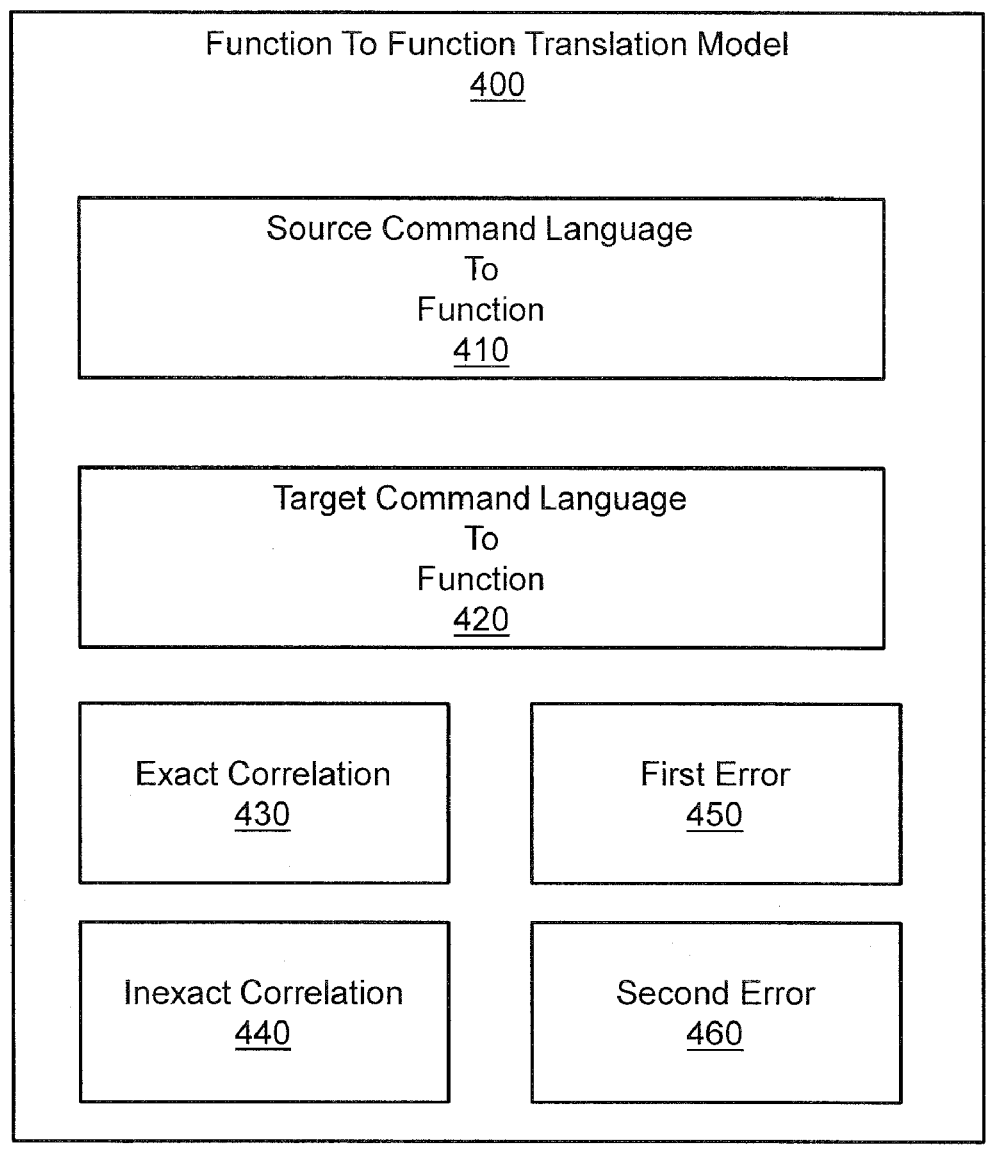
FIG. 4 illustrates a model associated with model driven command language translation.

FIG. 4 illustrates the function to function translation model 400. The model 400 includes a source command language to function portion 410. Portion 410 identifies functional effects that would be produced by executing one or more source commands in a given order.

The model 400 also includes a target command language to function portion 420. Portion 420 identifies functional effects that would be produced by executing one or more target commands in a given order.

The model 400 also includes an exact correlation portion 430. Portion 430 identifies functional effects that can be produced both by source commands being executed in a given order and by target commands being executed in a given order.

Sometimes a translation that produces identical functional equivalency cannot be made. Therefore model 400 also includes an inexact correlation portion 440. Portion 440 identifies a first functional effect that can be produced by source commands being executed in a given order. Portion 440 also identifies a related though not identical functional effect that can be produced by target commands being executed in a given order.

Sometimes no translation that produces even a related functional equivalency can be made. Therefore model 400 includes a first error portion 450 that identifies functional effects that can be produced by executing source commands in a given order but that cannot be produced by executing target commands in any order. Since errors may flow in different directions, model 400 also includes a second error portion 460 that identifies functional effects that can be produced by executing target commands in a given order but that cannot be produced by executing source commands in any order.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B), the term "or" is intended to mean "A or B or both". The phrase "only A or B but not both" indicates that "only A or B but not both" is to be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:
   identifying a first functional effect that would be produced in an apparatus by executing in the apparatus one or more source commands;
   determining whether the first functional effect is producible in the apparatus based on the apparatus executing one or more target commands, the one or more target commands being written in a different command language relative to the one or more source commands; and
   in response to determining that the first functional effect is producible in the apparatus based on the apparatus executing the one or more target commands, producing an output comprising the one or more target commands for execution by the apparatus, wherein the apparatus is a computer networking device; and the one or more source commands are presented to the computer networking device through a command line interface.

2. The method of claim 1, further comprising:
   in response to determining that the first functional effect cannot be produced in the apparatus based on the apparatus executing the one or more target commands,
      selectively producing an output comprising one or more related target commands that produce a second functional effect in the apparatus when executed by the apparatus, wherein the second functional effect is related to the first functional effect; and
      selectively adding to the output one or more of, a description of the first functional effect, an identifier of the first functional effect, a description of the second functional effect, an identifier of the second functional effect, a description of an alternative action, an error message, and an error identifier.

3. The method of claim 1, wherein the first functional effect corresponds to a state transition in the apparatus.

4. The method of claim 3, wherein identifying the first functional effect comprises identifying a transition from a first state of the apparatus to a second state of the apparatus, wherein the transition is known to be caused in response to the apparatus having executed the one or more source commands.

5. The method of claim 4, wherein:
   the first state, the second state, and the state transition are represented in a first state machine model associated with the apparatus; and
   identifying the first functional effect is based, at least in part, on the first state machine model.

6. The method of claim 1, wherein:
   the apparatus is a multi-layer computer networking switch; and
   the one or more source commands are presented to the multi-layer computer networking switch through a command line interface.

7. The method of claim 1, wherein determining whether the first functional effect is producible in the apparatus based on the apparatus executing the one or more target commands comprises:
   identifying a transition from a first state to a second state known to be caused in response to the apparatus having executed the one or more target commands.

8. The method of claim 7, wherein:
the first state, the second state, and the state transition are represented in a second state machine model associated with the apparatus; and
identifying the first functional effect is based, at least in part, on the second state machine model.

9. The method of claim 8, wherein the related functional effect is identified based, at least in part, on a correlation between (i) the transition from the first state to the second state and (ii) a different transition between two states in the second state machine model known to be caused in response to the apparatus having executed the one or more target commands.

10. A non-transitory computer-readable medium that stores instructions that when executed by at least a processor, cause an apparatus to perform a method, comprising:
identifying a first functional effect that would be produced in the apparatus by executing in the apparatus one or more source commands;
determining whether the first functional effect is producible in the apparatus based on the apparatus executing one or more target commands, the one or more target commands being written in a different command language relative to the one or more source commands; and
in response to determining that the first functional effect is producible in the apparatus based on the apparatus executing the one or more target commands, producing an output comprising the one or more target commands for execution by the apparatus wherein the apparatus is a computer networking device; and the one or more source commands are presented to the computer networking device through a command line interface.

11. The non-transitory computer-readable medium of claim 10, further comprising:
in response to determining that the first functional effect cannot be produced in the apparatus based on the apparatus executing the one or more target commands, selectively producing an output comprising one or more related target commands that produce a second functional effect in the apparatus when executed by the apparatus, wherein the second functional effect is related to the first functional effect; and
selectively adding to the output one or more of, a description of the first functional effect, an identifier of the first functional effect, a description of the second functional effect, an identifier of the second functional effect, a description of an alternative action, an error message, and an error identifier.

12. The non-transitory computer-readable medium of claim 10, further comprising: wherein the first functional effect corresponds to a state transition in the apparatus.

13. The non-transitory computer-readable medium of claim 10, further comprising: wherein identifying the first functional effect comprises identifying a transition from a first state of the apparatus to a second state of the apparatus, wherein the transition is known to be caused in response to the apparatus having executed the one or more source commands.

14. The non-transitory computer-readable medium of claim 13, further wherein:
the first state, the second state, and the state transition are represented in a first state machine model associated with the apparatus; and
identifying the first functional effect is based, at least in part, on the first state machine model.

15. The non-transitory computer-readable medium of claim 10, further comprising stored instructions that implement translation logic configured to selectively translate the one or more source commands from a source command language to the one or more target commands written in a target command language, wherein the translation is based, at least in part, on a function-to-function translation model.

\* \* \* \* \*